(12) United States Patent
    Maurer

(10) Patent No.: US 10,875,104 B2
(45) Date of Patent: Dec. 29, 2020

(54) CHUCK

(71) Applicant: SMW-AUTOBLOK Spannsysteme GmbH, Meckenbeuren (DE)

(72) Inventor: Eckhard Maurer, Oberteuringen (DE)

(73) Assignee: SMW-AUTOBLOK Spannsysteme GmbH, Meckenbeuren (DE)

( * ) Notice: Subject to any disclaimer, the term of this patent is extended or adjusted under 35 U.S.C. 154(b) by 0 days.

(21) Appl. No.: 14/937,079

(22) Filed: Nov. 10, 2015

(65) Prior Publication Data
    US 2016/0158848 A1 Jun. 9, 2016

(30) Foreign Application Priority Data

Dec. 4, 2014 (EP) .................................. 14196366
Jun. 9, 2015 (EP) .................................. 15171103

(51) Int. Cl.
    | | | |
    |---|---|---|
    | *B23B 31/16* | (2006.01) | |
    | *B23B 31/28* | (2006.01) | |
    | *B23Q 3/06* | (2006.01) | |
    | *H02J 5/00* | (2016.01) | |
    (Continued)

(52) U.S. Cl.
    CPC ............ *B23B 31/28* (2013.01); *B23B 31/101* (2013.01); *B23B 31/16045* (2013.01);
    (Continued)

(58) Field of Classification Search
    CPC . B23B 31/28; B23B 31/101; B23B 31/16045; B23B 2270/022;
    (Continued)

(56) References Cited

U.S. PATENT DOCUMENTS 1,974,249 A * 9/1934 Olson ..................... B23B 31/28
                                                  279/110
5,108,117 A * 4/1992 Crossman ............. B23Q 3/183
                                                  279/126
(Continued)

FOREIGN PATENT DOCUMENTS

| EP | 2298475 | 3/2011 |
| EP | 2676756 | 12/2013 |
| EP | 2837466 | 2/2015 |
| WO | WO 2013/023823 | 2/2013 |

*Primary Examiner* — Sunil K Singh
*Assistant Examiner* — Paul M Janeski
(74) *Attorney, Agent, or Firm* — Pandiscio & Pandiscio

(57) ABSTRACT

A chuck for supporting rotationally symmetrical workpieces to be machined, comprising a chuck body having at least three guideways worked into its end face running in the direction of the longitudinal axis of the chuck, at least three clamping jaws inserted individually into each of the guideways in a movable arrangement, and a driving means in a driving connection with the clamping jaws directly or via intermediate elements, with each of the clamping jaws of the chuck being adjustable during machining using driving means configured as an electric motor, with each clamping jaw having an electric motor arranged inside the chuck body, and when the chuck is stationary, the electric motors are electrically connected to a power source by means of a plug-and-socket connection and electrical cables, and/or when the chuck is rotating or at a standstill each electric motor is connected to the power source via an induction device.

6 Claims, 4 Drawing Sheets

(51) Int. Cl.
*B23Q 1/00* (2006.01)
*B23B 31/10* (2006.01)
*B23Q 1/52* (2006.01)

(52) U.S. Cl.
CPC ........... *B23Q 1/0009* (2013.01); *B23Q 1/522* (2013.01); *B23Q 3/06* (2013.01); *H02J 5/005* (2013.01); *B23B 2260/062* (2013.01); *B23B 2270/022* (2013.01)

(58) Field of Classification Search
CPC ............ B23B 2260/062; B23Q 1/0009; B23Q 1/522; B23Q 3/06; H02J 5/005
See application file for complete search history.

(56) References Cited

U.S. PATENT DOCUMENTS

| | | | | |
|---|---|---|---|---|
| 5,109,223 | A * | 4/1992 | Schmitt | B23Q 1/0009 |
| | | | | 340/870.31 |
| 5,453,598 | A * | 9/1995 | Hackett | G01M 1/30 |
| | | | | 219/503 |
| 7,364,393 | B2 * | 4/2008 | Collingwood | B23B 31/006 |
| | | | | 408/8 |
| 9,475,126 | B2 * | 10/2016 | Fujiwara | B23Q 3/18 |
| 2008/0157487 | A1 * | 7/2008 | Hall | B23B 31/101 |
| | | | | 279/4.12 |
| 2009/0080990 | A1 | 3/2009 | Mcmurtry et al. | |
| 2011/0006490 | A1 * | 1/2011 | Puppala | B23B 31/14 |
| | | | | 279/126 |
| 2012/0227886 | A1 * | 9/2012 | Hsiao | H01L 21/67346 |
| | | | | 156/60 |

* cited by examiner

CHUCK

REFERENCE TO PENDING PRIOR PATENT APPLICATIONS

This patent application claims benefit of European Patent Application No. 14 196 366.0, filed Dec. 4, 2014 and European Patent Application No. 15 171 103.3, filed Jun. 9, 2015, which patent applications are hereby incorporated herein by reference.

FIELD OF THE INVENTION

The present invention relates to a chuck for supporting rotationally symmetrical workpieces in accordance with the pre-characterising clause of Patent claim 1.

BACKGROUND OF THE INVENTION

Chucks of this kind have been disclosed in a wide range of different designs, for example in EP 2676756 A1. These chucks are chiefly used for holding a rotationally symmetrical workpiece centrally in space in relation to a longitudinal axis of a machine tool, so that it can machine with the greatest possible accuracy, maintaining machining tolerance errors as small as possible. At least three clamping jaws are to be provided in order to support the workpieces, and are mounted in a moving arrangement in one of the end faces of the chuck body of the chuck. These clamping jaws are normally moved synchronously by means of an actuation piston which is, for example, operated pneumatically or hydraulically, with the effect that they encounter the surface of the workpiece to be clamped simultaneously, and clamp it as a result of the advance force of the actuation piston.

The clamping jaws are often unable to undertake this centring of the workpiece to be clamped with the required level of accuracy, so it is necessary for three additional centring jaws to be provided by means of which the position of the workpiece in space is aligned as coaxially as possible with the longitudinal axis of the chuck body. As soon as this central position of the workpiece has been achieved, the clamping jaws can be advanced and the centring jaws are removed from the surface of the workpiece.

During the machining process, the chuck rotates and the actuation piston exerts a constant clamping force on the clamping jaws and thus on the workpiece. It is not possible to change the position of the clamping jaws during the machining process. The machining process often reduces the inherent weight of the workpiece to such an extent that the central position of the clamped workpiece is lost. As a result, the centring jaws subsequently have to repeat the precise alignment of the workpiece. Such centring procedures extend the machining process, thus significantly increasing the operating costs to manufacture workpieces of this kind.

It is thus the task of the present invention to develop further a chuck of the aforementioned type in such a way that, firstly, the chuck carries out the clamping and centring procedure exclusively using one clamping jaw insert and, secondly, centring of the clamped workpiece is possible during the machining process without changeover measures.

SUMMARY OF THE INVENTION

In accordance with the present invention, these tasks are accomplished by the features of the characterising part of Patent claim 1.

Other advantageous further embodiments of the present invention are derived from the subordinate claims.

Due to the situation that the driving means are configured as an electric motor, that each clamping jaw has an electric motor allocated to it, that each electric motor is arranged inside the chuck body and that, when the chuck is stationary, the electric motors are electrically connected to a power source by means of a plug-and-socket connection and electrical cables, whereas when the chuck is operational each is connected to the power source via an induction device, the existing clamping jaws can be used both for locking and supporting the workpieces to be machined as well as for centring them in the space because the individual control of the particular clamping jaws allows them to be moved opposite to one another alternately and/or held in their position, as a result of which the corresponding movements of the clamping jaws take place depending on the measured deviation from the specified centring position.

To move the clamping jaws while the workpiece is clamped, i.e. while it is in the machining process, it is merely necessary to align the chuck body in such a way that the three charging stations provided inside the chuck body are flush with the coupling stations of the induction device, so that the prevailing inductance ensures a sufficient energy transfer to the particular electric motors. This energy transfer enables the control device to move the electric motors in two different directions of rotation with the effect that the particular clamping jaw can be moved either in the direction of the longitudinal axis of the chuck body or in the opposite direction. This means the positions of the clamping jaws can be individually adjusted, thereby achieving precise centring of the workpiece that is to be clamped and held.

While the chuck is stationary, for example for changing workpieces, the electric cables of the electric motor can be connected to a normal power source by means of a plug-and-socket connection, with the effect that sufficient energy is available for advancing and centring the workpieces when the chuck is at a standstill. The lower amount of electrical energy transferred via the induction device is however sufficient for driving the electric motors in such a way that the clamping jaws are slightly adjusted.

BRIEF DESCRIPTION OF THE DRAWINGS

The drawing shows a sample embodiment of a chuck configured in accordance with the present invention, the details of which are explained below. In the drawing.

DETAILED DESCRIPTION OF THE INVENTION

Figure 1:
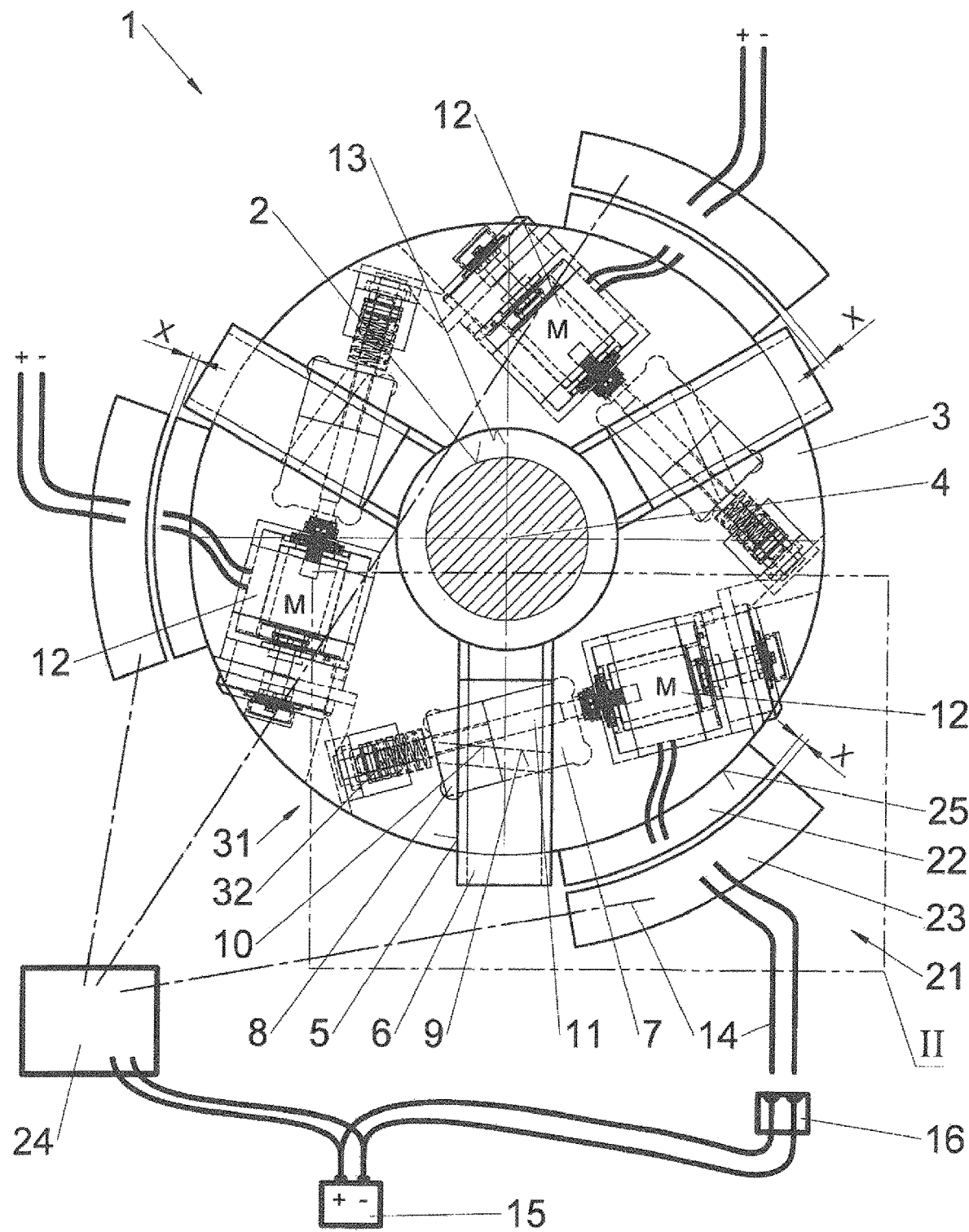
FIG. 1 shows a chuck with a chuck body that has three guideways worked into its end face, with three clamping jaws that are inserted individually into each of the guideways in a movable arrangement, and with three electric motors allocated to the particular clamping jaws, by means of which the position of the clamping jaws can be adjusted, and with a control unit for controlling the electric motors, in a plan view.

FIGS. 1, 2a, 2b and 2c disclose a chuck 1 which has the function of holding rotationally symmetrical workpieces 2 in the space on a machine tool that is not illustrated. The chuck 1 consists of a rotationally symmetrical chuck body 3, the longitudinal axis of which is provided with the reference number 4. For machining the workpiece 2, it is necessary for it to be positioned or aligned precisely in alignment with the longitudinal axis 4 of the chuck body 3. If the longitudinal axis of the workpiece 2 does not run flush with the longitudinal axis 4 of the chuck body 3, this will result in manufacturing errors during the machining process. Consequently, the chuck 1 according to the present invention should not only allow the flush alignment of the workpiece 2 with the longitudinal axis 4 of the chuck body 3 to be adjustable in the shortest possible time and with the least complicated design, but also the chuck 1 should allow the workpiece 2 be moved in its position or readjusted in its alignment when it is clamped, without the need to release the clamped condition.

Three guideways 5 running radially or in the direction of the longitudinal axis 4 are worked into one of the faces of the chuck body 3. A clamping jaw 6 is mounted in a movable arrangement in each of the guideways 5. Helical gearing 9 is worked onto the underside of the particular clamping jaws 6 facing in the direction of the chuck body 3, in which case this gearing is in a positive active connection with a wedge bar 8. The wedge bar 8 is mounted in a movable arrangement in support openings 7 of the chuck body 3 which are worked into the chuck body 3. It is also conceivable for the wedge bar 8 to be replaced by wedge hooks or other force transmission elements of a different configuration.

The wedge bar 8 has helical gearing 10 which is in a driving or positive-locking active connection with the helical gearing 9 of the particular clamping jaw 6, with the effect that when the wedge bar 8 is actuated or moved, a relative movement takes place between it and the clamping jaw 6 by means of which the clamping jaw 6 can be moved in the direction of the longitudinal axis 4 of the chuck body 3 or in the opposite direction.

In order to operate the particular wedge bar 8, threaded spindles 11 are provided in the chuck body 3, each of which is allocated to one of these wedge bars 8 and is connected not only to the particular wedge bar 8 but also to an electric motor 12 installed inside the chuck body 3. In this case, each of the three clamping jaws 6 is allocated to one of the electric motors 12, with the effect that each of the clamping jaws 6 can be moved or driven individually by means of each electric motor 12. The threaded spindles 11 and the wedge bars 8 are used for transmitting the force of the torque from the electric motor 12 to the clamping jaw 6.

Each of the electric motors 12 is connected via an electrical cable 14 to a control unit 24 arranged outside the chuck body 3. The electric motors 12 are used as driving means for the chuck jaws 6, and in order to supply them with adequate voltage or energy, each of the cables 14 has a plug-and-socket connection 16 allocated to it which is connected to a power source 15 by means of a plug and electrical cables 14 when the machine tool is at a standstill. Consequently, the power source 15 provides the necessary energy to the electric motors 12 for establishing the clamped condition for the clamping jaws 6 or carrying out the releasing procedure of the clamping jaws 6. In particular when the workpiece 2 is being changed out of the chuck 1, it is at a standstill meaning that the chuck body 3 does not rotate, as a result of which the plug-and-socket connection 16 between the power source 15 and the three electric motors 12 can be established.

During the machining process, the chuck body 3 of the chuck 1 rotates so that the plug-and-socket connection 16 between the chuck body 3 and the power source 15 must be disconnected. While the chuck body 3 is rotating, however, it is necessary to ensure that the clamping force that is exerted by the clamping jaws 6 onto the clamped workpiece 2 continues to be applied or is lost. For this purpose, each clamping jaw 6 first of all has a force accumulator device 31 configured as a coiled compression spring 32 allocated to it. The force accumulator device 31 consequently applies a clamping force to the clamping jaws 6 which is transmitted via the threaded spindle 11 and the wedge bar 8. The torque from the electric motor 12 is greater than the clamping force of the particular coiled compression spring 32. As a result of this, the electric motor 12 can actuate the coiled compression spring 32 against its spring force, and move the threaded spindle 11, the wedge bar 8 and consequently also the particular clamping jaw 6 in the direction of the longitudinal axis 4 of the chuck body 3, or in the opposite direction.

In order to allow the position of the clamping jaws 6 to be changed during the clamped condition without needing to establish the plug-and-socket connection 16 between the electric motors 12 and the power source 15, three induction devices 21 are provided consisting of a coupling section 22 allocated to the machine tool, i.e. outside the chuck body 3 and a charging section 23 arranged inside the chuck body 3. The coupling sections 22 and charging sections 23 possess a plurality of windings, which means that when the coupling sections 22 and the charging sections 23 are in alignment with one another when the machine tool is stationary, it is possible for a particular level of energy transfer to take place, by means of which the particular electric motors 12 can be operated with adequate energy to change the position of the clamping jaws 6.

Figure 2A:
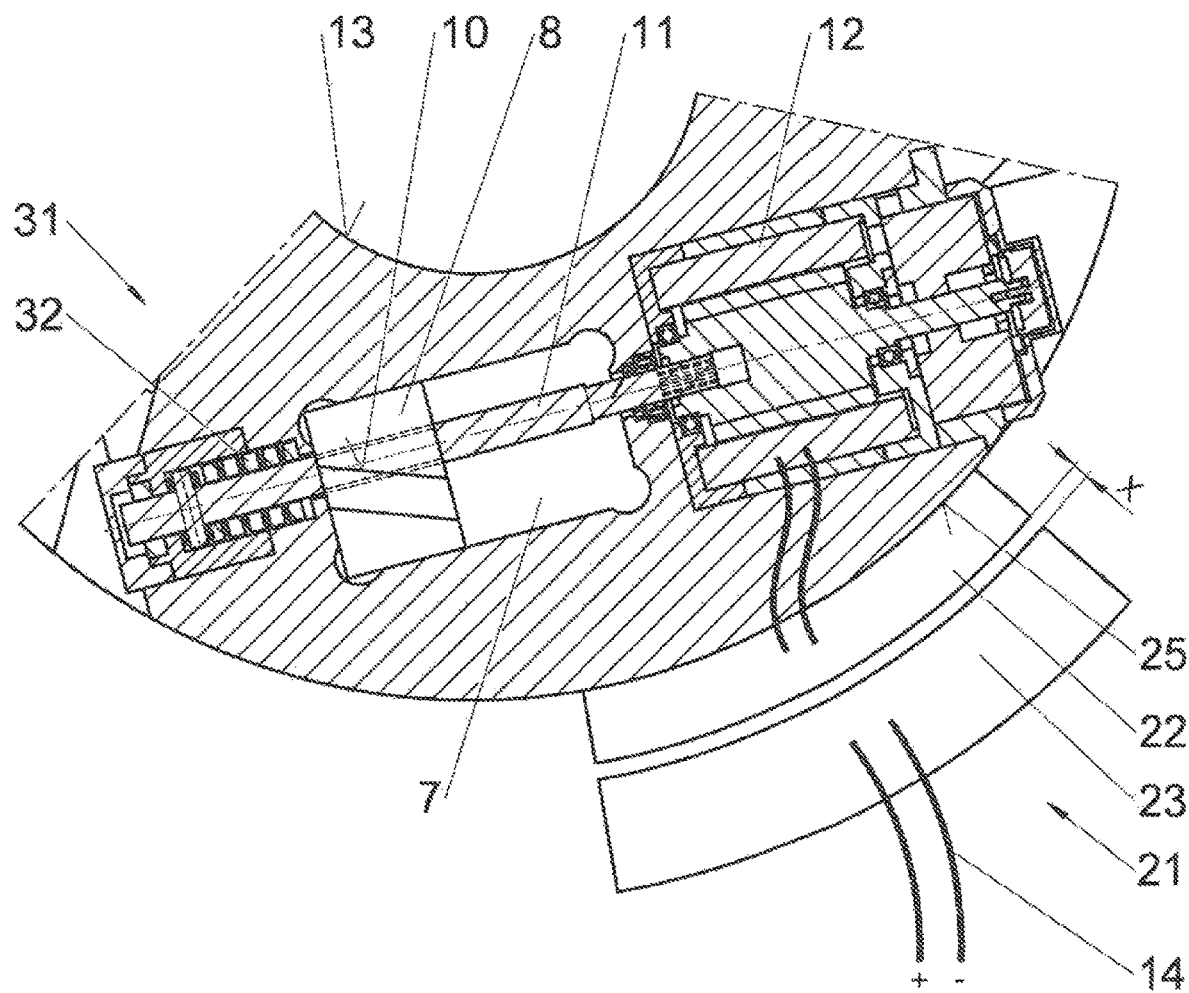
FIG. 2a shows the chuck in accordance with FIG. 1, in a magnified portion, in the area of one of the clamping jaws in the opened condition.

FIG. 2a shows the position in which the coiled compression spring 32 of the force accumulator device 31 is located in relation to the position of the threaded spindle 11 in this case. The threaded spindle 11 is set in rotation from its initial status by the electric motor 12 in accordance with FIG. 2a, and it moves the particular wedge bar 8 in a linear direction, as a result of which the clamping jaw 6 changes its position in relation to the distance from the longitudinal axis 4 of the chuck body 3 due to the helical gearing profiles 10 and 11 between the wedge bar 8 and the particular clamping jaw 6.

Figure 2B:
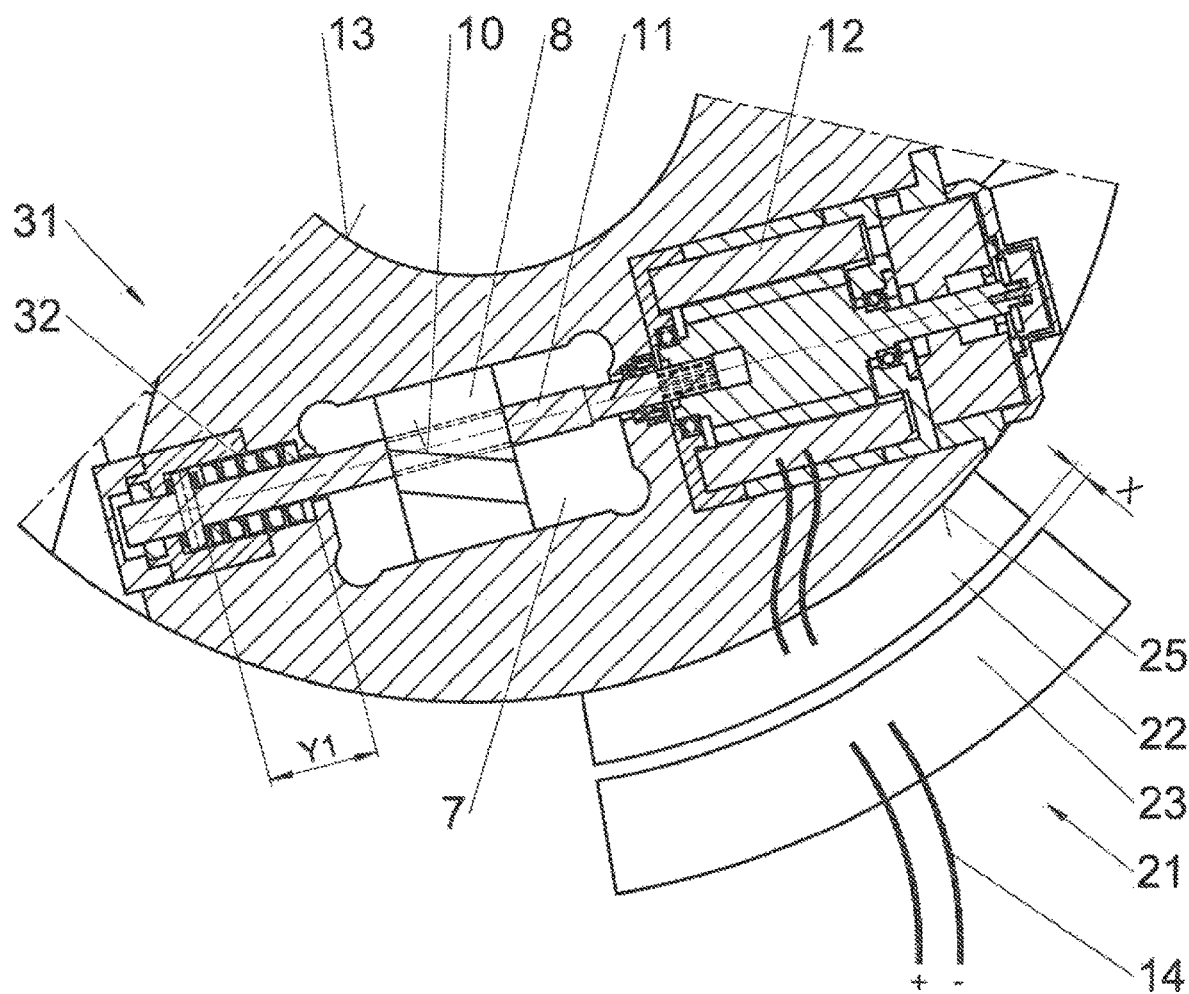
FIG. 2b shows the portion of the chuck in accordance with FIG. 2a during the advance movement of the clamping jaw and FIG. 2c shows the portion of the chuck in accordance with FIG. 2b, in clamped condition.

FIG. 2b shows the middle position and FIG. 2b the clamping position of the particular clamping jaws 6. By means of the control unit 24, it is possible for the induction devices 21, i.e. the coupling section 22 and the charging section 23 to be individually operated with the effect that the particular electric motors 12 that are also connected to the control unit 24 can be removed alternately or simultaneously in the direction of the longitudinal axis 4 of the chuck body 3, or in the opposite direction to that. As a result, the individual position change of the clamping jaws 6 by operating the particular electric motor 12 not only permits centring of the workpiece 2 in relation to the longitudinal axis 4 of the chuck body 3, but also ensures that adequate clamping force is permanently available for supporting the workpiece 2 to be held, because the position of the threaded spindle 11 and thus the wedge bar 8 and clamping jaw 6 is specified by the force accumulator device 31. A change in the position of the threaded spindle 11 is exclusively possible using the particular electric motor 12.

A passage opening 13 can be worked into the chuck 1 through which, for example, a long tube can be inserted as a workpiece 2. This is namely because such chucks 1 are often also used for machining outer threads onto tubes for oil or gas pipelines. The configuration of the chuck 1 in accordance with the present invention relates however to any kind of chuck 1, irrespective of its application, design configuration or dimensions.

Figure 2C:
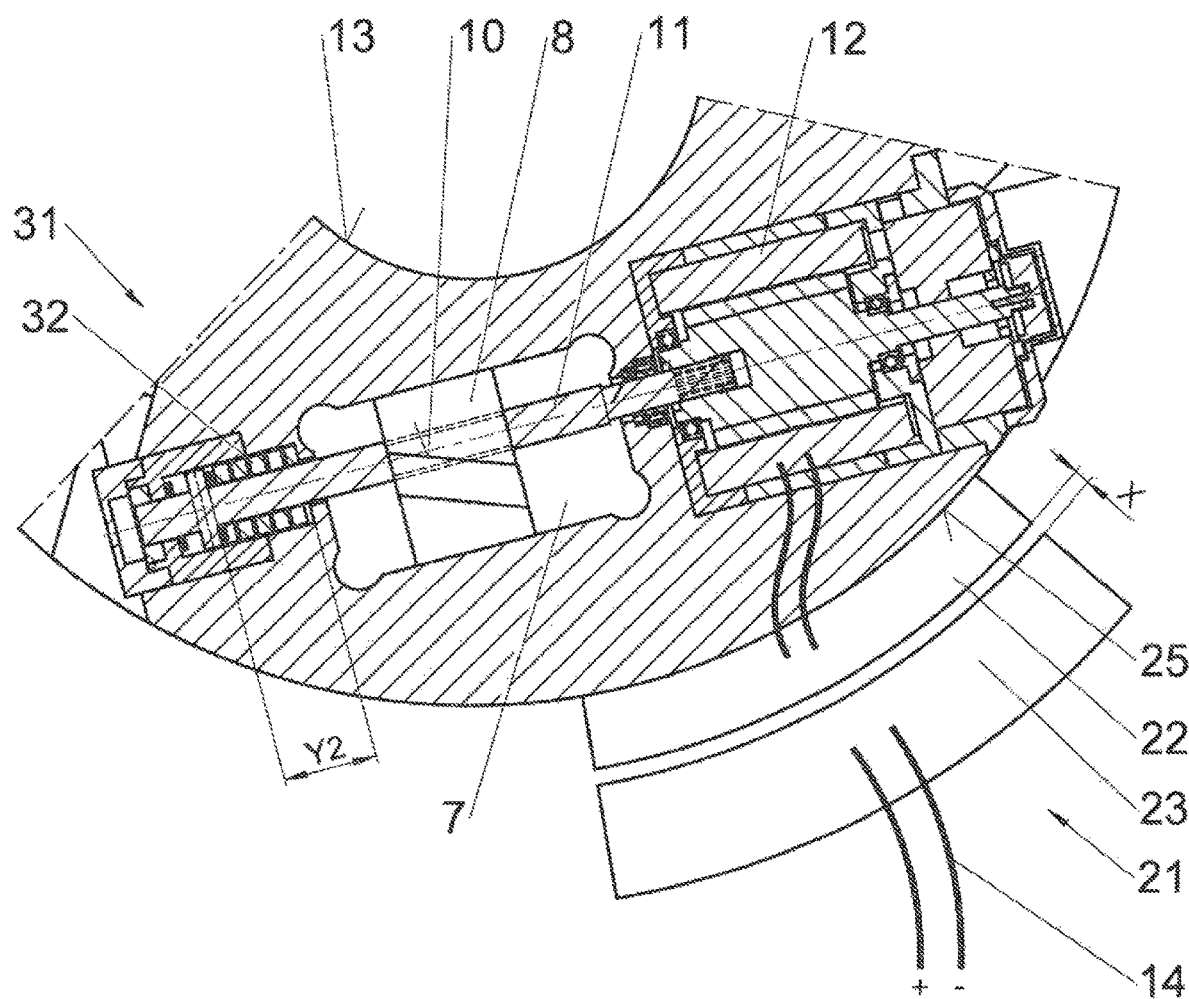

FIGS. 1 to 2c show alternative possible embodiments of the chuck 1. Firstly, each of the three electric motors 12 illustrated can be connected to the power source 15 electrically by means of the plug-and-socket connection 16, with the effect that when the chuck body 3 is stationary, the necessary electrical power for the electric motors 12 is drawn from the power source 15. By these means, the particular clamping jaws 6 in the guideways 5 of the chuck body 3 are opened or closed so as to achieve the clamping condition.

Another alternative for powering the electric motors 12, secondly, takes the form of the induction device 21, the coupling section 22 of which is allocated to the machine tool and the charging section 23 to the chuck body 3. As a result, the electric motors 12 can be powered both when the chuck 3 is stationary and when it is rotating, or when the clamping jaws 6 are clamped, because an air gap is provided between the charging section 23 and the coupling section 22, meaning that there is no friction between the chuck body 3 and the induction device 21.

What is claimed is:

1. A chuck (1) for supporting rotationally symmetrical workpieces (2) that are to be machined using a machine tool, the chuck (1) comprising:
    a chuck body (3) that has at least three guideways (5) worked into its end face running in the direction of the longitudinal axis (4) of the chuck (3);
    at least three clamping jaws (6) that are inserted individually into each of the guideways (5) in a movable arrangement; and
    a driving means (12) in a driving connection with the clamping jaws (6) via intermediate elements (8, 11), in which the driving means are configured as an electric motor (12), each of the at least three clamping jaws (6) having an electric motor (12) allocated to it, with each electric motor (12) being disposed inside the chuck body (3);
    wherein when the chuck (1) is stationary, the electric motors (12) are electrically connected to a power source (15) by means of a plug-and-socket connection (16) and electrical cables (14) and when the chuck (1) is rotating or at a standstill each electric motor (12) is connected to the power source via an induction device (21), wherein the induction device (21) comprises (i) a coupling section (22) mounted to the chuck body (3) such that the coupling section (22) rotates when the chuck body (3) rotates, and (ii) a charging section (23) which is stationary relative to the chuck body (3), and further wherein an uninterrupted gap of air separates the coupling section (22) from the charging section (23), such that power can be transmitted from the charging section (23) to the coupling section (22) across the uninterrupted gap of air while the chuck body (3) is rotating;
    wherein the chuck further comprises a control unit (24) configured to selectively, individually actuate one or more of the electric motors (12) so as to selectively, individually move one or more particular clamping jaws (6), whereby to keep a workpiece (2) centered in the chuck while the chuck is rotating; and
    wherein each of the clamping jaws (6) comprise a force accumulator device (31) configured to apply a force to that particular clamping jaw (6), wherein each force accumulator device comprises a spring for applying a force to the clamping jaws, and further wherein each force accumulator device is configured to maintain the position of each of the clamping jaws (6) when the one or more electric motors (12) are not applying a force to the clamping jaws (6).

2. The chuck in accordance with claim 1,
characterised in that,
an electrical cable is provided between the coupling section and the electric motor.

3. The chuck in accordance with claim 1,
characterised in that,
each of the clamping jaws (6) has helical gearing (9) facing the chuck body (3), that a wedge bar (8) is mounted in a movable arrangement in the chuck body (3) for each clamping jaw (6), that the wedge bar (8) has helical gearing (10) corresponding to the helical gearing (9) of the clamping jaws (6), that the clamping jaw (6) and the wedge bar (8) can be connected together in a positive arrangement and that the wedge bar (8) is in a driving active connection with a threaded spindle (11) that interacts in a driving arrangement with the particular electric motor (12).

4. The chuck in accordance with claim 1,
characterised in that,
the force of the electric motor (12) is larger than the locking force of the force accumulator device (31).

5. The chuck in accordance with claim 1,
characterised in that,
the force accumulator device (31) is configured as a coiled compression spring (32), the particular stored force of which is vectored opposite to the advance movement of the electric motor (12).

6. The chuck in accordance with claim 1,
characterised in that,
a passage opening (13) is worked into the chuck body (3) for accommodating the workpieces (2) to be machined, and that the longitudinal axis of the passage opening (13) is in alignment with the longitudinal axis of the chuck body (3).

* * * * *